Oct. 21, 1941.  A. E. LILLQUIST  2,259,574
SELECTIVE CONTROL SYSTEM FOR POWER DRIVEN MACHINE TOOLS
Filed Dec. 18, 1936
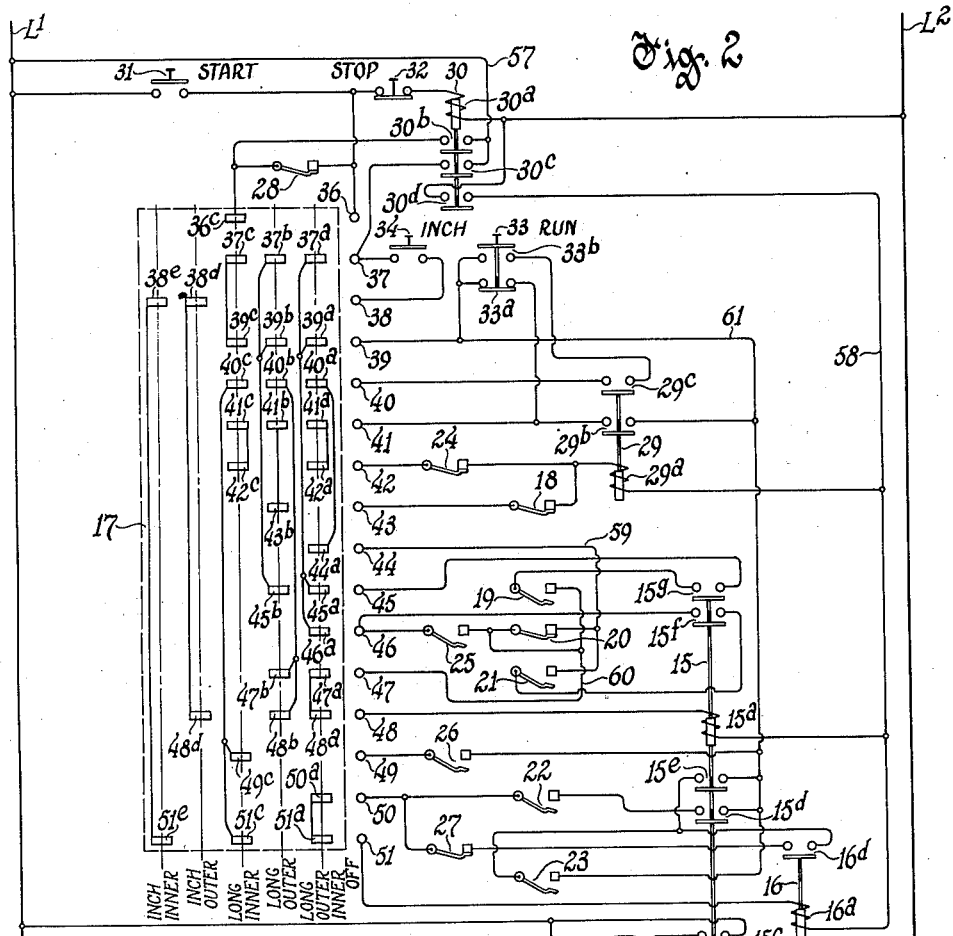
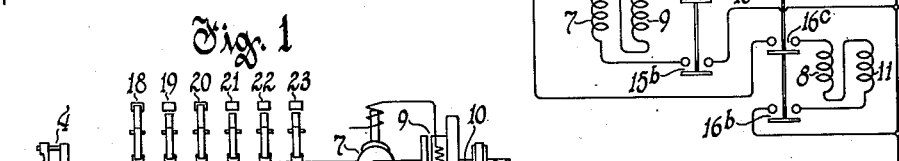
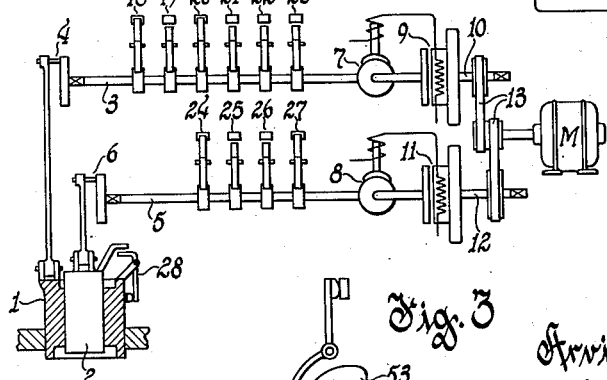
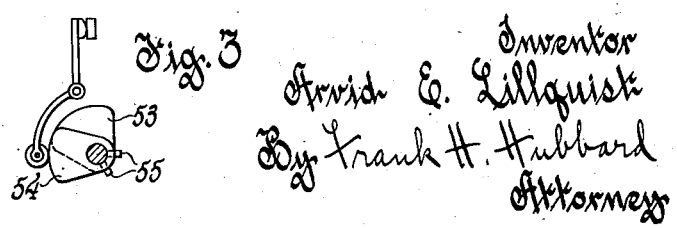
Inventor
Arvid E. Lillquist
By Frank H. Hubbard
Attorney Patented Oct. 21, 1941

2,259,574

UNITED STATES PATENT OFFICE 2,259,574

SELECTIVE CONTROL SYSTEM FOR POWER DRIVEN MACHINE TOOLS

Arvid E. Lillquist, Milwaukee, Wis., assignor to Cutler-Hammer, Inc., Milwaukee, Wis., a corporation of Delaware Application December 18, 1936, Serial No. 116,657

9 Claims. (Cl. 192—142)

This invention relates to selective control systems for power driven machine tools.

While not limited thereto the invention is especially applicable to controllers for power driven forming presses having a plurality of reciprocable slides each of which is driven through the medium of a clutch and is provided with a brake to be applied upon release of the clutch.

The invention has among its objects to provide an improved push button control system for forming presses of the aforesaid character.

Another object is to provide a controller for power presses of the aforesaid character including cooperatively related automatic and manual control instrumentalities for controlling the clutches and brakes to effect operation of the slides in various ways, as for example inching of the slides selectively, cycling of the slides individually or cycling of the slides in a definite sequence.

Another object is to provide a controller of the aforesaid character including a master switch which is readily adjustable to effect selection of the slide operations.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing,

Figure 1 is a schematic view of a multiple slide forming press embodying certain features of the invention;

Fig. 2 is a diagrammatic view of a control system for the press shown in Fig. 1, and Fig. 3 is a detail side elevational view of a conventional type of limit switch which may be used in the control system shown in Fig. 2.

Referring to Fig. 1, the same illustrates a forming press including reciprocable outer and inner slides 1 and 2, the former being operatively connected to a shaft 3 through the medium of a crank 4 and the latter being operatively connected to a shaft 5 through the medium of a crank 6. Shafts 3 and 5 are provided with normally engaged electromagnetic brakes 7 and 8, respectively, and shaft 3 has a normally released electromagnetic clutch 9 associated therewith for connecting the same to a drive shaft 10, while shaft 5 has a normally released electromagnetic clutch 11 associated therewith for connecting the same to a drive shaft 12. The shafts 10 and 12 are continuously driven in one direction by a motor M through the medium of belts 13.

Referring now to Fig. 2, the same illustrates a controller for the forming press shown in Fig. 1 which includes a normally open electromagnetic switch 15 for controlling an energizing circuit for brake 7 and clutch 9 and a normally open electromagnetic switch 16 for controlling an energizing circuit for brake 8 and clutch 11. The control means for switches 15 and 16 includes a master switch 17, a plurality of limit switches 18 to 23, inclusive, associated with shaft 3, a plurality of limit switches 24 to 27, inclusive, associated with shaft 5, and a limit switch 28 which is associated with the slides 1 and 2. The control means for switches 15 and 16 also includes normally open electromagnetic relays 29 and 30, a normally open start push button 31, a normally closed stop push button 32, a run push button 33 having normally open contacts 33$^b$ and normally closed contacts 33$^a$ and a normally open inch push button 34.

Master switch 17 is provided with stationary contacts 36 to 51, inclusive, and a movable contact drum having an off position and five different operative positions namely so called "long outer inner," "long outer," "long inner," "inch outer" and "inch inner" positions. Said drum is provided with sets of contact segments for bridging certain of the stationary contacts in each of the aforementioned operative positions, said sets of contact segments being designated by reference characters a, b, c, d, and e.

The limit switches 18 to 23, inclusive, are controlled in accordance with the angular position of shaft 3 and the limit switches 24 to 27, inclusive, are controlled in accordance with the angular position of shaft 5. Each of said limit switches may be biased to move into open position and be provided with a cam operating mechanism of the character shown in Fig. 3 for moving the same into closed position. The limit switch shown in Fig. 3 is provided with an operating arm to be engaged by a pair of overlapping cam elements 53 and 54, each of which is secured to the switch operating shaft by a set screw 55. As is apparent, the cam elements 53 and 54 may be adjusted with respect to the operating shaft to cause closure of the limit switch at any desired angular position of said shaft. Also it is apparent that the cam elements 53 and 54 may be adjusted with respect to each other to vary the period during which the operating shaft acts during each revolution to maintain the switch in closed position.

Limit switch 28 is normally closed and as shown in Fig. 1 the same is mounted upon the outer slide 1 and is operatively connected to the inner slide 2 to provide for opening thereof if said inner slide assumes a position too far in advance of the outer slide 1.

The function and operation of the aforedescribed controller and also the circuit connections therefor will now be more fully described.

Upon depression of start push button 31, relay 30 is energized by a circuit extending from line $L^1$ through said start button and stop button 32, and through the operating winding $30^a$ of said relay to line $L^2$. Relay 30 then responds and upon release of start button 31 said relay is maintained energized by a circuit extending from line $L^1$ by conductor 57 through contacts $30^b$ of said relay through limit switch 28 and stop button 32, and through the operating winding $30^a$ to line $L^2$.

With slides 1 and 2 in up position the several limit switches associated with shafts 3 and 5 are positioned as shown in Fig. 2. Assuming that relay 30 is in closed position and that the limit switches are positioned as shown in Fig. 2, movement of master switch 17 into its "long outer inner" position establishes an energizing circuit for relay 29 extending from line $L^1$ by conductor 57 through contacts $30^c$ of relay 30 to contact 37, through drum segments $37^a$ and $39^a$, to contact 39, through contacts $33^a$ of run push button 33 to contact 41, through drum segments $41^a$ and $42^a$ to contact 42, through limit switch 24 and the operating winding $29^a$ of relay 29 and by conductor 58 through contacts $30^d$ of relay 30 to line $L^2$. Relay 29 thus responds and in responding the contacts $29^b$ thereof shunt the contacts $33^a$ of run push button 33 to thereby maintain the aforedescribed energizing circuit for winding $29^a$ upon depression of said run push button.

Assuming now that run push button 33 is depressed, circuit is established from line $L^1$ through contacts $30^c$ of relay 30 to contact 37, through drum segments $37^a$ and $39^a$ to contact 39, through contacts $33^b$ of the run push button, through contacts $29^c$ of relay 29 to contact 40, through drum segments $40^a$ and $44^a$ to contact 44 by conductor 59 to and through limit switch 20 by conductor 60 to contact 47, through drum segments $47^a$ and $48^a$ to contact 48 through the operating winding $15^a$ of switch 15 and by conductor 58 through contacts $30^d$ of relay 30 to line $L^2$. Switch 15 is thus energized and in responding the contacts $15^b$ and $15^c$ thereof connect the operating windings of brake 7 and clutch 9 across lines $L^1$, $L^2$. Brake 7 is thus released and clutch 9 engaged to provide for downward operation of the outer slide 1.

After a given downward movement of outer slide 1 limit switch 21 closes and upon release of run push button 33 switch 15 is maintained energized by a circuit extending from line $L^1$ through contacts $30^c$ of relay 30 to contact 37 through drum segments $37^a$ and $46^a$ to contact 46 through auxiliary contacts $15^f$ of switch 15, through limit switches 21 and 20 by conductor 60 to contact 47 through drum segments $47^a$ and $48^a$ to contact 48, through the operating winding $15^a$ and by conductor 58 through contacts $30^d$ of relay 30 to line $L^2$. Just prior to completion of the working stroke of outer slide 1 limit switch 20 is opened to interrupt the energizing circuit for switch 15. Switch 15 then opens to automatically deenergize brake 7 and clutch 9 and the outer slide is brought to rest at the bottom of its working stroke under the action of said brake.

Before limit switch 20 opens to stop the outer slide 1 at the bottom of its working stroke limit switch 22 closes and establishes an energizing circuit for switch 16 extending from line $L^1$ through contacts $30^c$ of relay 30 to contact 37 through drum segments $37^a$ and $39^a$ to contact 39 by conductor 61 through auxiliary contacts $15^d$ associated with switch 15 through limit switch 22 to contact 50, through drum segments $50^a$ and $51^a$ to contact 51, through the operating winding $16^a$ of switch 16 and by conductor 58 through contacts $30^d$ of relay 30 to line $L^2$. Switch 16 thus responds and in responding the contacts $16^b$ and $16^c$ thereof connect the operating windings of brake 8 and clutch 11 across lines $L^1$, $L^2$. Brake 8 is thus released and clutch 11 engaged to provide for downward operation of the inner slide 2. Upon dropping out of switch 15 the aforedescribed energizing circuit for switch 16 is interrupted. However, prior to stopping of the outer slide 1 at the bottom of its working stroke limit switch 23 closes and upon dropping out of switch 15 switch 16 is maintained energized by a circuit extending from line $L^1$ to conductor 61 as already traced, through limit switch 23 and auxiliary contacts $16^d$ of switch 16 through limit switch 27 to contact 50 through drum segments $50^a$ and $51^a$ to contact 51 and through the operating winding $16^a$ of switch 16 to line $L^2$ as already traced.

Switch 16 remains in closed position until the inner slide 2 is moved downwardly through its working stroke and is returned toward its up position. When slide 2 approaches its up position limit switch 27 is momentarily opened to deenergize switch 16. Switch 16 then opens to automatically deenergize brake 8 and clutch 11 and the inner slide is brought to rest in its up position under the action of said brake. During final movement of slide 2 into its up position limit switch 23 is opened and limit switch 27 is reclosed.

Prior to completion of the working stroke of outer slide 1 limit switch 19 is moved into closed position and during return movement of the inner slide 2 toward its up position limit switch 25 is momentarily closed to reestablish an energizing circuit for switch 15 extending from line $L^1$ through contacts $30^c$ of relay 30 to contact 37 through drum segments $37^a$ and $46^a$ to contact 46 through limit switch 25 by conductor 60 to contact 47 through drum segments $47^a$, $48^a$ to contact 48 through the operating winding $15^a$ and by conductor 58 through contacts $30^d$ of relay 30 to line $L^2$. Upon response of switch 15 a maintaining circuit therefor is established from line $L^1$ through contacts $30^c$ of relay 30 to contact 37 through drum contacts $37^a$ and $45^a$ to contact 45, through auxiliary contacts $15^g$ associated with switch 15 to limit switch 19 by conductor 60 to contact 47 through drum segments $47^a$ and $48^a$ to contact 48 and thence through the operating winding $15^a$ to line $L^2$ as already traced. Clutch 9 and brake 7 are thus energized to provide for return of outer slide 1 toward its up position. Prior to full movement of outer slide 1 into its up position limit switch 19 opens to interrupt the aforedescribed maintaining circuit for switch 15 and said switch in dropping out deenergizes brake 7 and clutch 9 to provide for stopping of said slide in its up position under the action of said brake.

Upon a given upward movement of inner slide 2 limit switch 24 is opened and is maintained in open position until final movement of said slide into its up position. Opening of limit switch 24 interrupts the aforedescribed energizing circuit for relay 29 and upon dropping out of said relay the contacts 29c thereof open to render contacts 33b of the run push button ineffective to establish an energizing circuit for switch 15. It is thus apparent that relay 29 is controlled to prevent repetition of the aforedescribed "long inner outer" cycle of operation in case run push button 33 is held depressed throughout such cycle.

It should also be noted in connection with the foregoing that if the inner slide 2 is advanced too far beyond the outer slide 1 limit switch 28 is opened to interrupt the aforedescribed maintaining circuit for relay 30. Upon dropping out of relay 30 switches 15 and 16 are deenergized to insure immediate stopping of both of the slides 1 and 2. It is then necessary to inch the slides out of interfering position by means which will be hereinafter described before either of the slides can be restarted by run push button 33.

Assume now that both of the slides 1 and 2 are stopped in their upper position and that master switch 17 is moved into its long outer position. Upon closure of relay 30 by start push button 31, circuit is established from line L¹ through contacts 30c of said relay to contact 37 through drum segments 37b and 39b to contact 39, through contacts 33a of run push button 33 to contact 41 through drum segments 41b and 43b to contact 43 through limit switch 18 to and through winding 29a of relay 29 and by conductor 58 through contacts 30d of relay 30 to line L². As hereinbefore set forth, upon response of relay 29 the contacts 29b thereof shunt contacts 33a of run push button 33 to maintain winding 29a energized upon depression of said run push button. Assuming now that run push button 33 is depressed circuit is established from line L¹ through contacts 30c of relay 30 to contact 37 through drum segments 37b and 39b to contact 39 through contacts 33b of said run push button, through contacts 29c of relay 29 to contact 40 through drum segments 40b and 48b to contact 48 through the operating winding 15a of switch 15 and by conductor 58 and contacts 30d of relay 30 to line L². Switch 15 thus responds and as hereinbefore set forth the same establishes an energizing circuit for brake 7 and clutch 9 to provide for operation of the outer slide 1. As hereinbefore set forth limit switch 19 closes during downward movement of the outer slide 1 and upon closure of said limit switch, switch 15 is maintained energized by a circuit extending from line L¹ through contacts 30c of relay 30 to contact 37, through drum segments 37b and 45b to contact 45, through auxiliary contacts 15e associated with switch 15, through limit switch 19, by conductor 60 to contact 47, through drum segments 47b and 48b to contact 48 and thence through the operating winding 15a to line L² as already traced. The run push button can thus be released and switch 15 will be maintained energized until the energizing circuit therefor is interrupted by limit switch 19. As hereinbefore set forth limit switch 19 opens just prior to movement of the outer slide 1 into up position and upon opening of said limit switch the switch 15 is deenergized to deenergize brake 7 and clutch 9 for stopping of the outer slide 1 in its up position. Limit switch 18 is opened momentarily during final movement of the outer slide 1 into up position and upon opening thereof the maintaining circuit for relay 29 is opened to provide for dropping out of said relay. Upon dropping out of relay 29 the contacts 29c thereof open to render the run push button 33 ineffective to reestablish the aforedescribed energizing circuit for switch 15 until said push button is released to effect reclosure of its contacts 33a. Limit switch 18 thus acts to prevent repetition of the "long inner" cycle in case the run button 33 is held depressed.

Assume now that the inner slide is in its up position and master switch 17 is moved into its "long inner" position. Upon depression of start push button 31 relay 30 is energized as hereinbefore set forth, and upon response of said relay the operating winding thereof is maintained energized by a circuit extending from line L¹ by conductor 57 through contacts 30b to drum segment 36c to contact 36 and thence through stop button 32 and winding 30a to line L². Relay 29 is then energized by a circuit extending from line L¹ through contacts 30c of relay 30 to contact 37 through drum segments 37c and 39c to contact 39 through contacts 33a of the run push button to contact 41 through drum segments 41c and 42c to contact 42, through limit switch 24 to and through the operating winding 29a and by conductor 58 and contacts 30b to line L². Relay 29 then responds and maintains itself as hereinbefore set forth. Upon depression of run push button 33 circuit is established from line L¹ through contacts 30c to contact 37, through drum segments 37c and 39c to contact 39 through push button contacts 33b and contacts 29c of relay 29 to contact 40 through drum segments 40c and 51c to contact 51, through the operating winding 16a of switch 16 and by conductor 58 and contacts 30d to line L². Switch 16 thus responds and as hereinbefore set forth in responding the same provides for operation of the inner slide 2. During downward movement of the inner slide 2 limit switch 26 closes to establish a maintaining circuit for switch 16 extending from line L¹ through contacts 30c of relay 30 to contact 37, through drum segments 37c and 39c to contact 39, by conductor 61 through limit switch 26 to contact 49, through drum segments 49c and 51c to contact 51 and thence through the operating winding 16a of switch 16 to line L² as already traced. Upon establishment of the aforedescribed maintaining circuit for switch 16 the run push button 33 can be released and switch 16 will remain in closed position until the inner slide 2 approaches its up position. During final movement of the inner slide 2 into its up position limit switch 26 opens to interrupt the maintaining circuit for switch 16 and said switch then drops out to deenergize brake 8 and clutch 11 for stopping of the inner slide 2 in its up position. During the long inner cycle limit switch 24 acts in the same manner as during the long inner outer cycle to prevent repetition of the former cycle if run push button 33 is maintained depressed.

As hereinbefore set forth, if the inner slide 2 advances too far beyond the outer slide 1 limit switch 28 is opened to deenergize relay 30 for stopping of both of the slides. Assuming that the slides were stopped in this manner and it is desired to inch outer slide 1 out of interfering position with the inner slide 2, master switch 17 is moved into its "inch outer" position and with the same in this position start button 31 and inch button 33 are depressed. Depression of start button 31 energizes relay 30 through the medium of stop button 32 and upon response of said relay the inch button 34 when depressed establishes an energizing circuit for switch 15 extending from line L¹ through contacts 30ᶜ of relay 30 through the inch push button 34 to contact 38 through drum segments 38ᵈ and 48ᵈ to contact 48 and thence through the operating winding 15ᵃ and contacts 30ᵈ to line L². Switch 15 will thus be energized as long as push buttons 31 and 34 are maintained depressed to effect operation of the outer slide 1.

Assuming now that it is desired to inch the inner slide 2, master switch 17 is moved into its "inch inner" position and start button 31 and inch button 34 are depressed. Relay 30 is then closed as hereinbefore set forth and the inch button 34 establishes circuit from line L¹, through contacts 30ᶜ of said relay, through the inch button 34 to contact 38, through drum segments 38ᵉ and 51ᵉ to contact 51, through the operating winding 16ᵃ of switch 16 and through contacts 30ᵈ of relay 30 to line L². Switch 16 will thus remain in closed position as long as push buttons 31 and 34 are maintained depressed, to effect operation of inner slide 2.

In connection with the foregoing it should be noted that the invention is not limited to presses having electromagnetically operated brakes and clutches. For example, the invention may be used in connection with presses having electrically controlled pressure operated brakes and clutches. Also it is apparent that the invention is not necessarily limited to a system for effecting the specific cycles of operation hereinbefore described.

What I claim as new and desire to secure by Letters Patent is:

1. In a controller for machine tools having a plurality of elements provided with separate drives, in combination, a clutch for controlling each of said drives, and cooperating manual and automatic means for controlling said clutches, said manual means including a selector switch adapted when set in different positions to render said automatic means operable to effect cycling of said elements individually or in a definite sequence and said automatic means comprising a plurality of switches controlled in accordance with the position of said elements.

2. In a controller for machine tools having a plurality of separately driven parts, in combination, a drive for each of said parts including a normally engaged electromagnetically controlled brake and a normally released electromagnetically controlled clutch, and cooperating manual and automatic means for controlling said clutches and brakes to provide selected operations of said parts including individual inching of said parts, individual cycling thereof or cycling of said parts in a given sequence.

3. The combination with a machine tool having a plurality of reciprocable elements, separate drives for said elements each including a normally released electromagnetically controlled clutch and cooperating manual and automatic control means for said clutches including a master switch adapted to be set in different positions to render said automatic means effective to control said clutches for selected cycles of operation of said elements, said automatic means including a plurality of limit switches controlled in accordance with the position of said elements.

4. The combination with a machine tool having a plurality of reciprocable elements, separate drives for said elements each including a normally released electromagnetically controlled clutch, and cooperating manual and automatic control means for said clutches including a selector switch and a plurality of limit switches for controlling said clutches through the medium of said selector switch, said limit switches providing for cycling of said elements individually in given settings of said selector switch and for cycling of said elements in a given sequence in another setting of said selector switch.

5. The combination with a machine tool having a plurality of reciprocable elements, separate drives for said elements each including a normally released electromagnetically controlled clutch, cooperating manual and automatic control means for said clutches including a selector switch and a plurality of limit switches for controlling said clutches through the medium of said selector switch, said limit switches providing for cycling of said elements individually in given settings of said selector switch and for cycling of said elements in a given sequence in another setting of said selector switch, and means for controlling said clutches in other settings of said selector switch to provide for inching of said elements selectively.

6. The combination with a machine tool having a plurality of slides each movable through a working and a return stroke, and power drives individual to said slides each including a normally released clutch, of an electromagnetic control device for each of said clutches, each of said devices being responsive to effect engagement of its associated clutch, and control means for said devices including a selector switch and a plurality of switches controlled in accordance with the position of said slides for controlling said devices through the medium of said selector switch, said devices being controlled by certain of said switches upon setting of said selector switch in a given position to effect operation of said clutches for working and return strokes of said slides in a predetermined sequence, said devices being also controlled individually by certain of said switches upon setting of said selector switch in other positions to render a selected clutch operable to effect a single working and return stroke of its associated slide without operation of the other of said slides.

7. The combination with a machine tool having a plurality of slides each movable through a working and a return stroke and power drives individual to said slides each including a normally released electromagnetically operated clutch, of control means for said slides including a manual selector switch and a plurality of switches controlled in accordance with the position of said slides for controlling said clutches through the medium of said selector switch, said clutches being controlled by certain of said switches upon setting of said selector switch in a given position to effect working and return strokes of said slides in a predetermined sequence, said clutches being also controlled individually by certain of said switches upon setting of said selector switch in other positions to provide for operation of a selected slide through a single working and return stroke without operation of the other of said slides.

8. The combination with a machine tool having a plurality of slides each movable through a working and a return stroke, of power drives individual to said slides each including a normally released electromagnetically operated clutch, a manual selector switch, a plurality of switches controlled in accordance with the position of said slides, certain of said switches acting upon setting of said selector switch in a given position to control said clutches for working and return strokes of said slides in a predetermined sequence and certain of said switches also acting upon setting of said selector switch in other given positions to render a selected clutch operable to effect a single working and return stroke of its associated element without operation of the other of said slides, and manual control means operable upon setting of said selector switch in positions other than those aforementioned to selectively control said clutches for inching operations of said slides.

9. The combination with a machine tool having two separately operable slides each movable through a working and a return stroke, and separate drives for said slides each including a normally released power operated clutch, of an electromagnetic control device associated with each of said clutches for effecting release and engagement thereof, and means for controlling said devices including a plurality of limit switches controlled in accordance with the position of said slides, said devices being controlled by said switches to effect operation of said clutches for working strokes of said slides in a given sequence and return strokes thereof in a reversed sequence.

ARVID E. LILLQUIST.